(12) United States Patent
Katsurada et al.

(10) Patent No.: US 11,869,459 B2
(45) Date of Patent: Jan. 9, 2024

(54) DISPLAY CONTROL DEVICE AND DISPLAY CONTROL METHOD FOR CONTROLLING THE DISPLAY OF GRAPHIC OBJECTS IN DYNAMICALLY CHANGED DISPLAY REGIONS

(71) Applicant: Faurecia Clarion Electronics Co., Ltd., Saitama (JP)

(72) Inventors: Isao Katsurada, Saitama (JP); Jitsu Ezaki, Saitama (JP)

(73) Assignee: Faurecia Clarion Electronics Co., Ltd., Saitama (JP)

(*) Notice: Subject to any disclaimer, the term of this patent is extended or adjusted under 35 U.S.C. 154(b) by 0 days.

(21) Appl. No.: 17/505,877

(22) Filed: Oct. 20, 2021

(65) Prior Publication Data

US 2022/0130348 A1    Apr. 28, 2022

(30) Foreign Application Priority Data

Oct. 22, 2020   (JP) ................................ 2020-177492

(51) Int. Cl.
    *G09G 5/377*      (2006.01)
    *G06F 3/0481*    (2022.01)
    (Continued)

(52) U.S. Cl.
    CPC ........... *G09G 5/377* (2013.01); *G06F 3/0481* (2013.01); *G06F 3/04886* (2013.01);
    (Continued)

(58) Field of Classification Search
    None
    See application file for complete search history.

(56) References Cited

U.S. PATENT DOCUMENTS

| 2009/0164936 A1* | 6/2009 | Kawaguchi | G06F 3/0481 715/788 |
| 2010/0050114 A1* | 2/2010 | Braun | G06F 16/54 715/788 |

(Continued)

FOREIGN PATENT DOCUMENTS

| JP | 2020-080055 A | 5/2020 |
| JP | 2020-102084 A | 7/2020 |

(Continued)

OTHER PUBLICATIONS

Jiang et al., 'ORC Layout: Adaptive GUI Layout with OR-Constraints', CHI 2019, pp. 1-12. (Year: 2019).*

*Primary Examiner* — Patrick F Valdez
(74) *Attorney, Agent, or Firm* — Volpe Koenig

(57) ABSTRACT

A display control device includes a display region setting unit configured to dynamically change a size of one or a plurality of display regions provided on a screen by changing a position of a boundary line of the display regions, a display control unit configured to dynamically change a size of an arrangement region provided in the display region in response to a dynamic change in size of the display region, and control display of at least one or more display objects arranged in the arrangement region, and a priority setting unit configured to set relative priority of the display objects provided in the same arrangement region, wherein the display control unit controls display of the display object by visual processing, based on the set priority, in response to a dynamic change in size of the display region and the arrangement region.

10 Claims, 10 Drawing Sheets

(51) Int. Cl.
*G09G 5/373* (2006.01)
*G06F 3/04886* (2022.01)

(52) U.S. Cl.
CPC ......... *G09G 5/373* (2013.01); *G09G 2340/04* (2013.01); *G09G 2380/10* (2013.01)

(56) References Cited

U.S. PATENT DOCUMENTS

| | | | |
|---|---|---|---|
| 2013/0167080 A1* | 6/2013 | Ari | G06F 3/0481 |
| | | | 715/801 |
| 2018/0081398 A1* | 3/2018 | Shin | G09G 5/005 |
| 2019/0012078 A1* | 1/2019 | Ishiguro | G06F 3/0484 |
| 2019/0121539 A1* | 4/2019 | Sato | G06F 3/04842 |
| 2020/0326850 A1 | 10/2020 | Ezaki | |
| 2020/0327868 A1 | 10/2020 | Ezaki | |

FOREIGN PATENT DOCUMENTS

| | | | | |
|---|---|---|---|---|
| JP | 2020-173685 A | 10/2020 | | |
| JP | 2020-173686 A | 10/2020 | | |
| WO | WO-2017111075 A1 * | 6/2017 | ........... | G06F 3/0484 |

* cited by examiner

DISPLAY CONTROL DEVICE AND DISPLAY CONTROL METHOD FOR CONTROLLING THE DISPLAY OF GRAPHIC OBJECTS IN DYNAMICALLY CHANGED DISPLAY REGIONS

BACKGROUND

The present invention relates to a display control device and a display control method.

As a solution related to information display in a display, for example, JP 2020-102084 A (PTL 1) describes a technique for changing a size of one or a plurality of display regions provided on a screen of a display and also changing a size of an arrangement region provided in the display region, in response to an operation from a user, and deleting at least one or more display objects arranged in the arrangement region, based on relative priority of the display objects when the size of the display region and the arrangement region is reduced, and causing the deleted display object to appear, based on the priority, when the size of the display region and the arrangement region is expanded.

PTL 1: JP 2020-102084 A

SUMMARY

The technique described in PTL 1 can delete a display object such as an icon according to relative priority of the display object, and redisplay the display object from the deleted state, in response to a change in size of the display region. However, deletion and redisplay of the display object are suddenly performed, and thus a user may not recognize which display object is deleted next and which display object is redisplayed next.

The present invention has been made in view of such circumstances, and has an object to be able to make a user easily recognize which display object is deleted next and which display object is redisplayed next.

The present application includes a plurality of solutions to at least a part of the problems described above. One example of the solutions is as follows.

In order to solve the problem described above, a display control device according to one aspect of the present invention includes a display region setting unit configured to dynamically change a size of one or a plurality of display regions provided on a screen by changing a position of a boundary line of the display regions, a display control unit configured to dynamically change a size of an arrangement region provided in the display region in response to a dynamic change in size of the display region, and control display of at least one or more display objects arranged in the arrangement region, and a priority setting unit configured to set relative priority of the display objects provided in the same arrangement region, wherein the display control unit controls display of the display object by visual processing, based on the set priority, in response to a dynamic change in size of the display region and the arrangement region.

One aspect of the present invention can make a user easily recognize which display object is deleted next and which display object is redisplayed next.

Note that problems, configurations, and effects other than those described above will become apparent in the following description of the embodiments.

DESCRIPTION OF EMBODIMENTS

With reference to the drawings, an embodiment of the present invention is described below. Note that, in all the drawings for describing the embodiment, in principle, the identical members are denoted with the identical reference symbols, and repeated description therefor is omitted as appropriate. In the following embodiment, it goes without saying that constituent elements therein (including element steps and the like) are not necessarily essential unless otherwise particularly stated or incontrovertibly considered as essentials in principle. When the expressions "constituted of A", "being formed of A", "including A", and "comprising A" are given, it goes without saying that the expressions are not intended to exclude elements other than A unless A otherwise is clearly stated as the only element. Similarly, in the following embodiment, when shapes, positional relationships, and the like of the constituent elements and the like are referred to, substantially approximate or similar shapes and the like are included unless otherwise particularly stated or incontrovertibly considered to be different in principle or the like.

<Configuration Example of Onboard Device 10 According to One Embodiment of Present Invention>

An onboard device 10 according to one embodiment of the present invention is described below. The onboard device 10 corresponds to a display control device according to the present invention.

Figure 1:
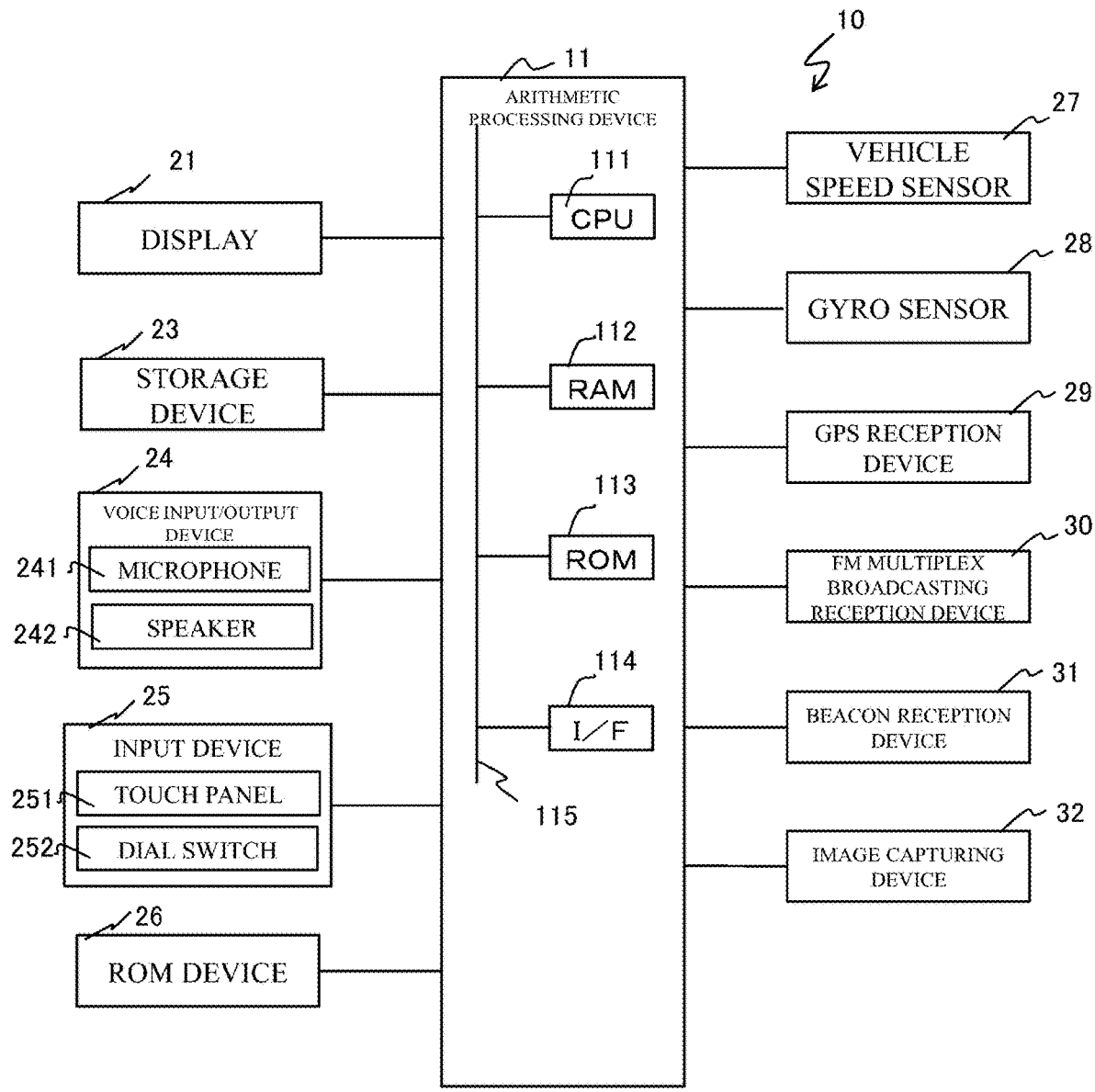
FIG. 1 is a block diagram illustrating a configuration example of an onboard device according to one embodiment of the present invention.

FIG. 1 illustrates a configuration example of the onboard device 10 according to one embodiment of the present invention. The onboard device 10 can be implemented with an onboard navigation device having a navigation function, for example.

The onboard device 10 can display, in addition to a navigation screen relevant to the navigation function, an air-conditioning screen for setting a temperature, an air flow rate, and the like of an air-conditioner, an audio video (AV) screen for selecting and reproducing audio or a video to be reproduced and for setting a sound volume, image quality, and the like, a screen for an application (electronic mail, social network service (SNS), and the like) executed by a smartphone that is wirelessly connected, a telephone screen for outgoing and incoming calls, a camera screen for displaying an image captured by an onboard camera, and the like.

The onboard device 10 includes an arithmetic processing device 11, a display 21, a storage device 23, a voice input/output device 24, an input device 25, and a read only memory (ROM) device 26.

The onboard device 10 further includes a vehicle speed sensor 27, a gyro sensor 28, a global positioning system (GPS) reception device 29, a frequency modulation (FM) multiplex broadcasting reception device 30, a beacon reception device 31, and an image capturing device 32.

The arithmetic processing device 11 is a central unit that performs various types of processing of the onboard device 10. The arithmetic processing device 11 detects a current place through use of information output from various sensors such as the vehicle speed sensor 27, and the GPS reception device 29, for example. Based on the obtained current place information, the arithmetic processing device 11 reads map information required for display from the storage device 23 and the ROM device 26. The arithmetic processing device 11 develops the read map information into graphics and overlaps a mark indicating the current place thereon, to generate and output an image signal to be displayed on the display 21. The arithmetic processing device 11 calculates a recommended route connecting a departure place (current place) and a target place instructed from a user (a driver or a passenger), through use of map information and the like stored in the storage device 23 or the ROM device 26. The arithmetic processing device 11 performs route navigation by outputting a predetermined signal to a speaker 242 and the display 21.

The arithmetic processing device 11 can set one or a plurality of display regions 211 (FIG. 3) on a display screen of the display 21, and can change a size of each display region 211 in response to an operation from a user and an occurrence of a predetermined event. The arithmetic processing device 11 displays, in a predetermined display manner, a predetermined display object (such as an icon) independently for each of the display regions 211.

The arithmetic processing device 11 as described above includes a central processing unit (CPU) 111 that executes various types of processing for performing arithmetic operations and controlling each of the devices, a random access memory (RAM) 112 that temporarily stores map information, arithmetic data, and the like having been read from a memory device such as the storage device 23 and a ROM 113, the ROM 113 that stores a boot program and the like executed by the CPU 111, an interface (I/F) 114 for connecting various types of hardware to the arithmetic processing device 11, and a bus 115 that connects those components to each other.

The display 21 is installed at the center of the console panel provided on the front surface inside the vehicle, for example. A transparent touch panel 251 is layered on the display 21. A user can perform a touch operation on (the touch panel 251 layered on) the display 21. However, an operation on the display 21 may also be performed through use of a dial switch 252.

The storage device 23 is formed of a storage medium capable of performing at least reading and writing, such as a hard disk drive (HDD) and a non-volatile memory card. Various pieces of information (for example, map information and the like) used by the arithmetic processing device 11 are stored in the storage device 23, for example.

The voice input/output device 24 includes a microphone 241 as a voice input device and the speaker 242 as a voice output device.

The input device 25 is a device that receives an instruction input from a user. The input device 25 includes the touch panel 251, the dial switch 252, a scroll key being another hard switch, and the like (not illustrated). The input device 25 outputs information in accordance with an operation of each of the keys and switches to another device such as the arithmetic processing device 11.

The touch panel 251 is layered on the display screen of the display 21. The touch panel 251 detects a touch operation by a finger of a user or a touch pen.

The ROM device 26 is formed of a storage medium capable of at least reading digital data, such as a ROM exemplified by a compact disk (CD)-ROM and a digital versatile disk (DVD)-ROM and an integrated circuit (IC) card. Video data, audio data, voice data, and the like are stored in the storage medium, for example.

The vehicle speed sensor 27 acquires a value (such as the number of revolutions of a tire) used for calculation of a vehicle speed. The gyro sensor 28 detects angular velocity of rotation of a moving body (vehicle). The GPS reception device 29 measures a current place, a traveling speed, and a traveling direction of the moving body, based on signals from GPS satellites. Those devices are used for the arithmetic processing device 11 in order to detect a current place of a vehicle to which the onboard device 10 is mounted.

The FM multiplex broadcasting reception device 30 receives FM multiplex broadcasting that is transmitted through use of an FM broadcasting wave. The FM multiplex broadcasting includes an outline of current traffic information of vehicle-information-and-communication-system (VICS) information, and the like.

The beacon reception device 31 receives, for example, the outline of current traffic information of the VICS information transmitted by light or a radio wave or the like. The image capturing device 32 is a so-called onboard camera, and captures an image of a vehicle inside and a vehicle outside (around a vehicle).

Figure 2:
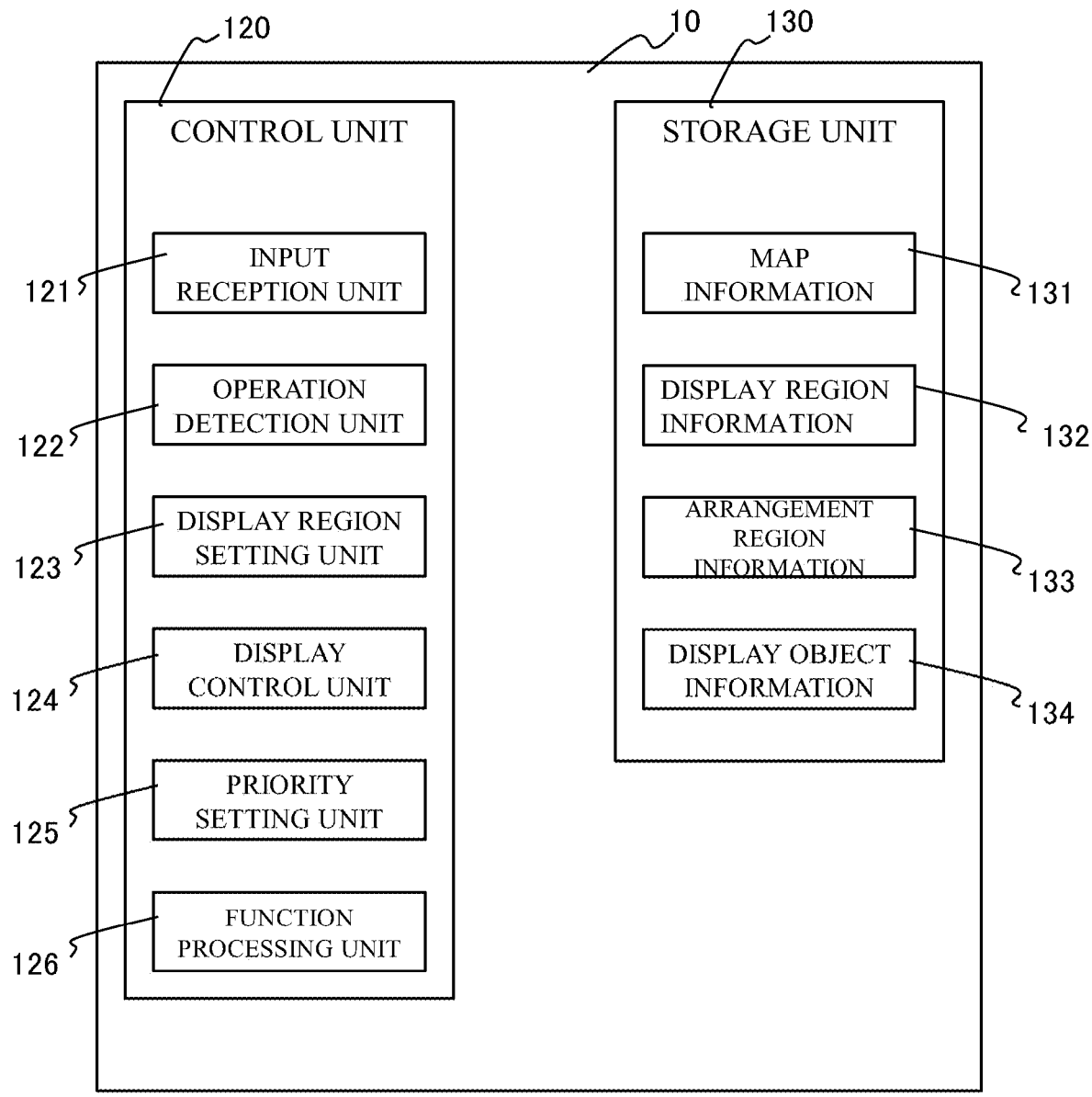
FIG. 2 is a diagram illustrating one example of a functional block of the onboard device.

Next, a functional block indicating a functional configuration of the onboard device 10 is described. FIG. 2 illustrates one example of the functional block of the onboard device 10.

The onboard device 10 includes a control unit 120 and a storage unit 130.

The control unit 120 includes an input reception unit 121, an operation detection unit 122, a display region setting unit 123, a display control unit 124, a priority setting unit 125, and a function processing unit 126.

The input reception unit 121 receives an instruction and an input of information from a user through the input device 25. The operation detection unit 122 detects a touch operation from a user on the touch panel 251 being the input device 25.

The display region setting unit 123 sets one or the plurality of display regions 211 (FIG. 3) on the display screen of the display 21. The display region setting unit 123 can dynamically change a division state (a position and a size) of the display region 211 or prompt a user to change the division state of the display region 211, in response to an occurring event.

Here, the event refers to a touch operation by a user, a change in vehicle speed, reception of traffic information, reception of an emergency warning, a transition to an automatic driving state, activation of an external camera, a switch to a camera screen, reception of e-mail and a message, an incoming call, an approach to an intersection, guidance of a right/left turn, an operation of a turn signal, an approach of an emergency vehicle, detection of sleepiness, detection of a biological abnormality, a recommendation based on a behavior history (such as a notification in the vicinity of a store stopped by everyday), and the like.

Note that a case where the display screen of the display 21 is divided into three will be described below as an example, but the number of divisions may be two, four, or more. The display region setting unit 123 may display only one display region on the display screen without dividing the display screen. Furthermore, for example, in response to an occurrence of an event such as an incoming call, a telephone screen may be displayed in an enlarged manner or may be displayed in a pop-up manner so as to overlap the currently displayed display region divided into three.

Figure 4:
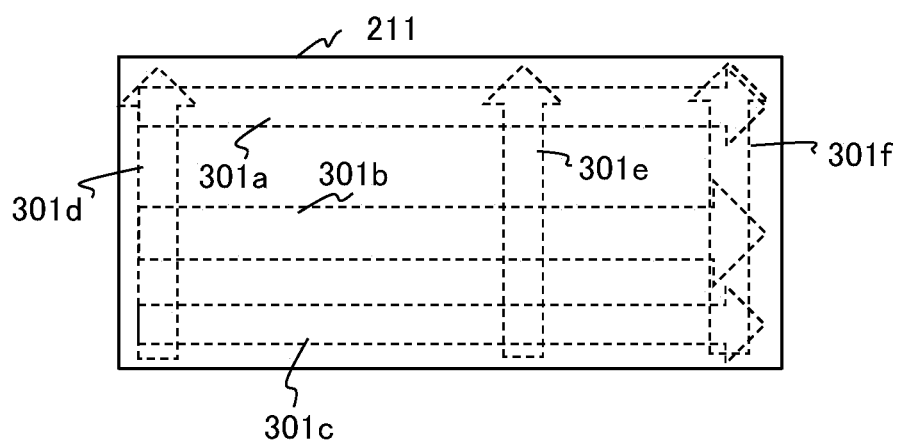
FIG. 4 is a diagram illustrating an example of an arrangement region set in the display region.
Figure 5:
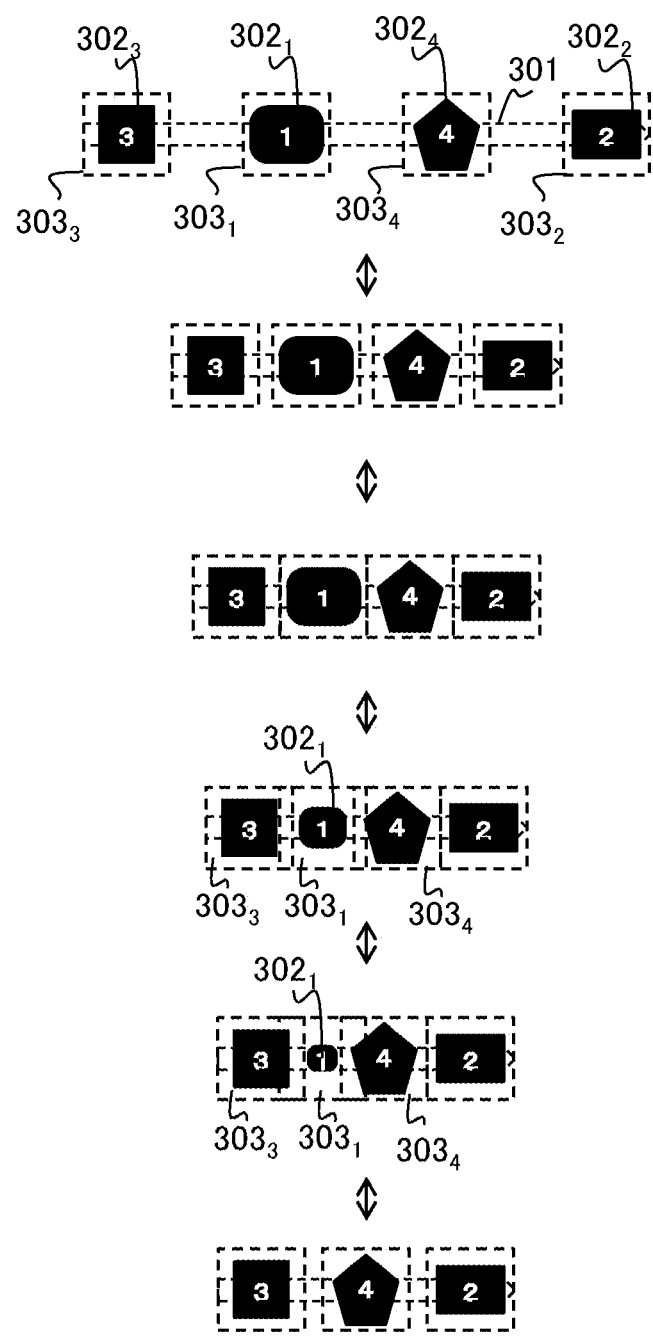
FIG. 5 is a diagram illustrating one example of display control based on priority of a display object.

The display control unit 124 controls setting of an arrangement region 301 (FIG. 4) in each of the display regions 211, and display of a display object 302 (FIG. 5). The display control unit 124 sets attribute information (details will be described later) for the arrangement region 301 and the display object 302. Furthermore, the display control unit 124 changes a size, a position, attribute information, and the like of the arrangement region 301 in response to a change in size of the display region 211. The display control unit 124 changes a position and attribute information of the display object 302 arranged in the display region 301 in response to a change in size of the arrangement region 301.

The priority setting unit 125 sets priority for the arrangement region 301 provided in the display region 211 and the display object 302 arranged in the arrangement region 301. The priority setting unit 125 can set a predetermined initial value as priority for the arrangement region 301 and the display object 302, and then change the priority according to an input from a user.

The priority setting unit 125 may learn a situation when priority is changed, and dynamically change the priority, based on the learning result. Here, the situation refers to a state of information that can be acquired by the onboard device 10, such as a current place of a vehicle to which the onboard device 10 is mounted, a traveling speed, a traffic situation, a temperature, weather, and a time period. Specifically, for example, priority of the arrangement region 301 and the display object 302 corresponding to an air-conditioning function may be increased in a predetermined time period, and the like.

Furthermore, the priority setting unit 125 can temporarily increase priority for the arrangement region 301 and the display object 302 corresponding to a predetermined event in response to an occurrence of the predetermined event, and reset the temporarily increased priority to an original value in response to an end of the predetermined event.

Note that, when priority is changed, display of the arrangement region 301 and the display object 302 based on the priority is also dynamically changed. The priority setting unit 125 updates arrangement region information 133, based on priority set for the arrangement region 301, and updates display object information 134, based on priority set for the display object 302.

The function processing unit 126 performs processing for achieving a predetermined function in response to a touch operation from a user performed on an operation reception button displayed in the display region of the display 21. Such a function herein is, for example, a navigation function, air-conditioning setting, reproduction of a video and music, transmission/reception of e-mail and a message, outgoing and incoming calls, and the like.

The storage unit 130 stores predetermined information. The storage unit 130 is implemented with the ROM 113 and the storage device 23. Various types of information such as map information 131, display region information 132, the arrangement region information 133, the display object information 134, and others are stored in the storage unit 130.

Information on landforms, roads, and the like that are used for the navigation function is recorded as the map information 131. A division state of each of the display regions 211 provided on the display screen of the display 21 is recorded as the display region information 132. A shape, a size, a position, attribute information, and priority of the arrangement region 301 provided in each of the display regions 211 are recorded as the arrangement region information 133. Data, attribute information, and priority of the display object 302 (such as an icon, an image, text, a pop-up, and a list as an operation reception button) displayed in each of the display regions 211 are recorded as the display object information 134.

Note that the functional blocks of the onboard device 10, which are the input reception unit 121, the operation detection unit 122, the display region setting unit 123, the display control unit 124, the priority setting unit 125, and the function processing unit 126, are implemented by the CPU 111 executing predetermined programs. The programs are stored in the ROM 113 or the storage device 23 of the onboard device 10, and are loaded on the RAM 112 at the time of execution and executed by the CPU 111.

Each functional block illustrated in FIG. 2 is classified according to its main processing contents, for the sake of easier understanding of the functions of the onboard device 10 implemented in the present embodiment. Therefore, how each function is classified and referred to does not limit the present invention. Each configuration of the onboard device 10 can be classified into more components, according to the processing contents. Each configuration can be classified so that one component executes more processing.

All or a part of the functional blocks may be constituted by hardware (an integrated circuit such as an ASIC, or the like) implemented in a computer. Processing of each of the functional blocks may be executed by one piece of hardware, or may be executed by a plurality of pieces of hardware.

<Display Region on Display Screen of Display 21>

Next, the display region 211 set on the display screen of the display 21 will be described. As described above, in the onboard device 10, the display region setting unit 123 can divide the display screen of the display 21, and provide the plurality of (three in the present embodiment) display regions 211.

Figure 3:
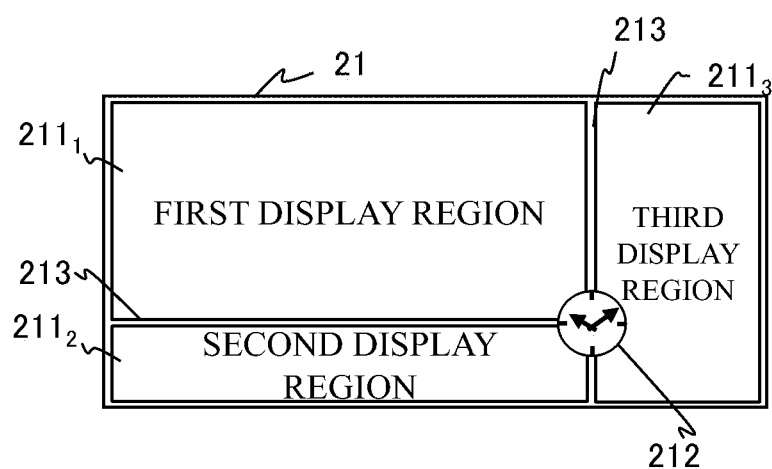
FIG. 3 is a diagram illustrating a display example of a display region set on a display screen of a display.

FIG. 3 illustrates a display example of the three display regions 211 (a first display region $211_1$, a second display region $211_2$, and a third display region $211_3$) set on the display screen of the display 21.

For example, a navigation screen, an air-conditioning screen, an AV screen, an application screen, a telephone screen, a camera screen, and the like can be assigned to each of the display regions 211. A plurality of operation reception buttons related to different functions (for example, an air-conditioner, an audio, and a call) may be displayed in a coexisting manner in one display region 211.

When the plurality of display regions 211 are provided on the display 21, the display control unit 124 provides a moving display region 212 in a position where boundary regions 213 between the display regions 211 intersect. A specific display object (an analog clock in a case of FIG. 3) can be displayed in the moving display region 212. When a user touches and drags the specific display object displayed in the moving display region 212, the display control unit 124 moves a display position of the moving display region 212. Then, the display region setting unit 123 dynamically changes a size of each of the display regions 211 on the display screen in response to the movement of the moving display region 212, and confirms the size of each of the display regions 211 when the user releases the touch from the moving display region 212.

Note that movement of the moving display region 212 and a change in size of each of the display regions 211 due to the movement are performed in response to not only an operation from a user but also an occurrence of an event.

A minimum size that is not allowed to be further reduced can be set for each of the display regions 211.

In response to the display region setting unit 123 dynamically changing a state of each of the display regions 211, the display control unit 124 dynamically changes display of the display object 302 arranged in each of the display regions 211. Details thereof will be described later.

Not only the touch panel 251 but also the dial switch 252 can be used for receiving an operation of a user performed on the moving display region 212 on the display screen.

<Arrangement Region 301 Provided in Display Region 211>

Next, the arrangement region 301 provided in each of the display regions 211 will be described. FIG. 4 is a diagram illustrating one example of a plurality of arrangement regions 301a to 301f provided in the display region 211.

The arrangement regions 301a to 301f are regions for arranging the display objects 302 (FIG. 5) such as an operation reception button, various icons, a thumbnail image, and text information. Note that, in the drawing, positions of the arrangement regions 301a to 301f in the display region 211 are indicated by broken lines, but the arrangement region 301 is not displayed on an actual screen. In other words, a user cannot visually recognize the arrangement region 301.

In the example in FIG. 4, the arrangement regions 301a, 301b, and 301c elongated in the horizontal direction and the arrangement regions 301d, 301e, and 301f elongated in the vertical direction are provided in the display region 211. Hereinafter, when the arrangement regions 301a to 301f do not need to be individually distinguished, the arrangement regions 301a to 301f are simply referred to as the arrangement region 301.

The arrangement region 301 has an axis (not illustrated) (hereinafter referred to as a directional axis) having directivity (vector) from one end (a start point) of the region toward another end (an end point). The directional axis of the arrangement region 301 is not limited to a straight line parallel to the horizontal direction or the vertical direction of the display region 211, and may be a straight line in a slanting direction. The directional axis is not limited to a straight line, and may be a curved line.

A shape of the arrangement region 301 is, for example, a rectangle. However, in FIG. 4, the arrangement region 301 is illustrated as an arrow region in order to represent a direction of the directional axis thereof. Note that, a shape of the arrangement region 301 is not limited to a rectangle, and may be another shape.

Hereinafter, a length of the directional axis of the arrangement region 301 is referred to as a directional axis length, and a length in a direction orthogonal to the directional axis of the arrangement region 301 is referred to as a width.

The arrangement region 301 has a directional axis length and a position being changed while a direction of the directional axis and a width are maintained in response to a change in size of the display region 211. A maximum value can be set for the directional axis length of the arrangement region 301.

In response to an operation from a user, the display control unit 124 can set, for the arrangement region 301, an offset value representing a distance from an end of the display region 211 to the arrangement region 301. Furthermore, the display control unit 124 can set, for the arrangement region 301, an offset value representing a distance from an end of the display region 211 to the arrangement region 301 according to a width of the arrangement region 301.

<Attribute Information of Display Object 302>

Next, FIG. 5 is a diagram for illustrating relative priority of display objects $302_1$ to $302_4$ arranged in the arrangement region 301, and a visible state or an invisible state as attribute information. Hereinafter, when the display objects $302_1$ to $302_4$ do not need to be individually distinguished, the display objects $302_1$ to $302_4$ are simply referred to as the display object 302.

For the display object 302 arranged in the arrangement region 301, relative priority of the other display object 302 arranged in the same arrangement region 301 can be set. A subscript continued from the display object 302 (for example, "1" of the display object $302_1$) is a value representing priority. In a case of the present embodiment, it is assumed that a greater value represents higher priority. The same also applies to the following drawings.

A visible state or an invisible state is set as attribute information for each of the display objects 302 arranged in the arrangement region 301.

Furthermore, collision determination regions $303_1$ to $303_4$ are provided for each of the display objects $302_1$ to $302_4$ arranged in the arrangement region 301, respectively. Hereinafter, when the collision determination regions $303_1$ to $303_4$ do not need to be individually distinguished, the collision determination regions $303_1$ to $303_4$ are simply referred to as the collision determination region 303. In a case of FIG. 5, a shape of the collision determination region 303 is a rectangle, but a shape thereof is not limited to a rectangle.

The collision determination region 303 is a region for determining a collision between the display objects 302 adjacent to each other in the arrangement region 301, is not displayed on the screen, and is not visually recognized from a user.

In the example in FIG. 5, the display objects $302_1$ to $302_4$ varying in priority are arranged in the arrangement region 301, and pieces of attribute information of the display objects $302_1$ to $302_4$ are all set to a visible state in a state indicated in an uppermost column (first column).

When, in response to an operation from a user or an occurrence of an event, for example, a size of the display region 211 (not illustrated) is reduced from the state indicated in the uppermost column, and a directional axis length of the arrangement region 301 is accordingly reduced, the display objects $302_1$ to $302_4$ are displayed closer to each other while maintaining each size until the collision determination regions $303_1$ to $303_4$ come into contact, as indicated in a second column and a third column in FIG. 5.

Then, when the size of the display region 211 is further reduced, and the directional axis length of the arrangement region 301 is accordingly reduced, the collision determination region $303_3$ of the display object $302_3$ and the collision determination region $303_4$ of the adjacent display object $302_4$ overlap the collision determination region $303_1$ of the display object $302_1$ having lowest priority, the collision determination region $303_3$ and the collision determination region $303_4$ being adjacent to the collision determination region $303_1$, as indicated in a fourth column and a fifth column in FIG. 5. Then, visual processing is performed on the display object $302_1$ according to the degree of overlapping.

In a case of FIG. 5, as the visual processing according to the degree of overlapping between the collision determination regions 303, the size of the display object $302_1$ is gradually reduced and is displayed. However, instead of or in addition to gradually reducing the size, for example, display may fade out by increasing transmittance of the display object $302_1$, brightness or color may be changed, a gradation may be applied to a tone, and the like. Furthermore, in addition to the visual processing, for example, sound or vibration may be generated. Performing such visual processing can make a user recognize that the display object $302_1$ is about to be eliminated.

Then, when the size of the display region 211 is further reduced, and the directional axis length of the arrangement region 301 is accordingly reduced, a degree of overlapping of, with respect to the collision determination region $303_1$ of the display object $302_1$ having lowest priority, the collision determination region $303_3$ of the adjacent display object $302_3$ and the collision determination region $303_4$ of the adjacent display object $302_4$ becomes equal to or greater than a predetermined threshold value. In this case, as indicated in a sixth column in FIG. 5, the display object $302_1$ is deleted (attribute information is changed from a visible state to an invisible state, and the display object $302_1$ is deleted from the screen).

Hereinafter, a situation where the attribute information is changed from a visible state to an invisible state to delete the display object 302 from the screen is also referred to as "elimination". Conversely, a situation where the attribute information is changed back from an invisible state to a visible state to display the display object 302 again on the screen is also referred to as "restoration".

In contrast, when the directional axis length of the arrangement region 301 is extended according to an expansion of the size of the display region 211 (not illustrated), display of the display object 302 transitions from a lower column side to an upper column side in FIG. 5. In other words, a degree of overlapping of, with respect to the collision determination region $303_1$ of the display object $302_1$ being eliminated (having the attribute information changed to an invisible state and being deleted from the screen), the collision determination region $303_3$ of the adjacent display object $302_3$ and the collision determination region $303_4$ of the adjacent display object $302_4$ becomes less than a predetermined threshold value. In this case, by the visual processing of changing the attribute information of the display object $302_1$ from an invisible state to a visible state, gradually expanding the size of the display object $302_1$ according to a degree of overlapping between the collision determination regions 303, and the like, the display object $302_1$ is restored and displayed between the display object $302_3$ and the display object $302_4$. In this way, a user can recognize that the display object $302_1$ is restored and displayed.

Note that an initial value is predetermined for relative priority of the display objects 302 arranged in the same arrangement region 301, but the priority setting unit 125 can change the relative priority in response to an operation from a user. When the display object 302 is an operation reception button, the priority setting unit 125 may change priority according to a frequency of an operation from a user, or may set priority of the previously operated display object 302 to the highest level.

Furthermore, the priority setting unit 125 may dynamically change priority according to a traveling situation (such as a speed) of a vehicle by, for example, lowering priority of the display object 302 being a character string during traveling, and the like. Furthermore, the priority setting unit 125 may learn a situation when priority is changed, and dynamically change the priority according to the learning result. In this way, visibility of the display object 302 for a user and operability when the display object 302 is an operation reception button can be improved.

<Display Control Processing Performed by Onboard Device 10>

Figure 6:
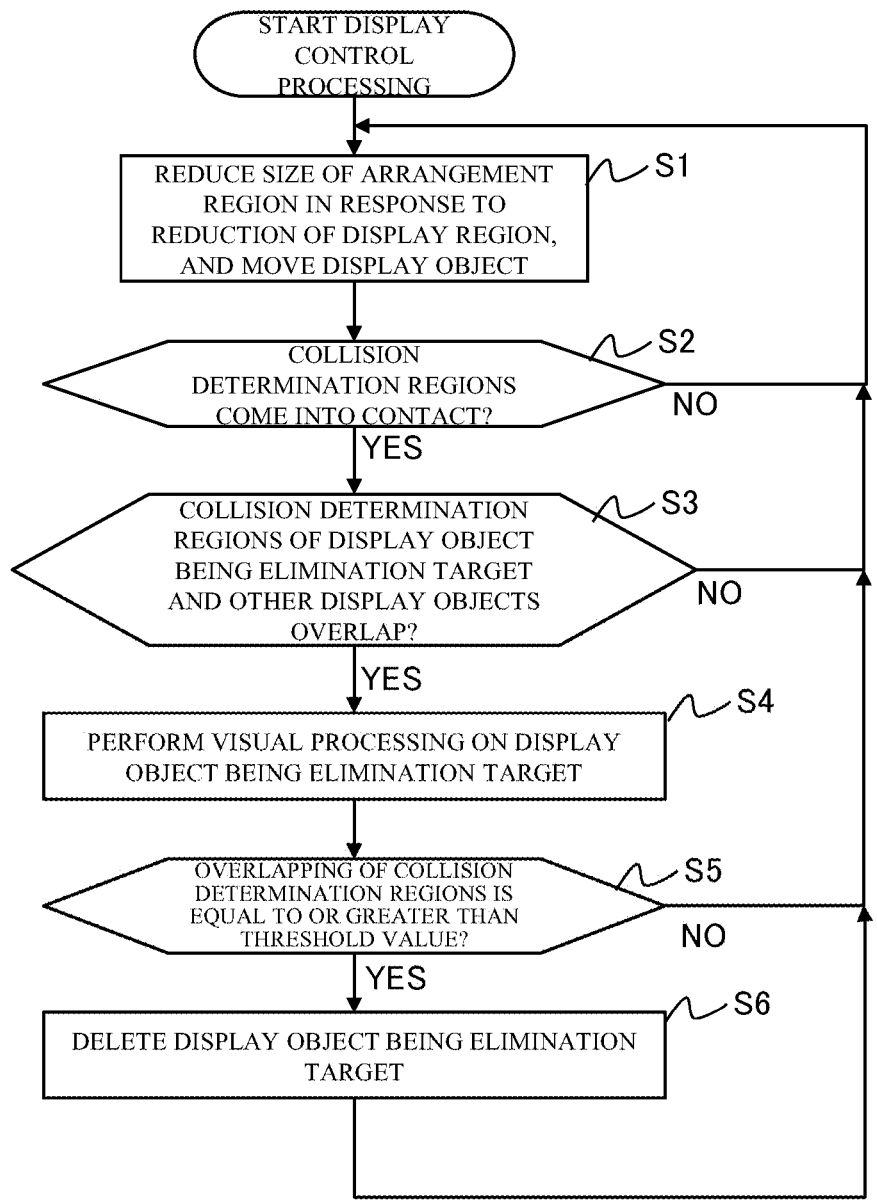
FIG. 6 is a flowchart for illustrating one example of display control processing when the display object is deleted.

Next, FIG. 6 is a flowchart for illustrating one example of display control processing for achieving elimination of the display object 302 by the visual processing illustrated in FIG. 5.

The display control processing starts after the onboard device 10 is activated, and is continuously performed until an operation of the onboard device 10 ends.

First, when the display region setting unit 123 reduces a size of each of the display regions 211 in response to an occurrence of an event that reduces the size of the display region 211, the display control unit 124 changes a size and a position of the arrangement region 301 provided in each of the display regions 211. Then, the display control unit 124 moves each of the display objects 302 arranged in the same arrangement region 301 in a direction in which an interval between the display objects 302 is reduced (Step S1).

Next, the display control unit 124 determines whether the collision determination regions 303 of each of the display objects 302 arranged in the same arrangement region 301 come into contact with each other (Step S2). Here, when the display control unit 124 determines that the collision determination regions 303 do not come into contact with each other (NO in Step S2), the processing returns to Step S1, and Step 1 and the steps thereafter are repeated.

Then, when the size of the display region 211 and the arrangement region 301 is further reduced, the interval between each of the display objects 302 is further reduced, and the display control unit 124 determines that the collision determination regions 303 of each of the display objects 302 arranged in the same arrangement region 301 come into contact with each other (YES in Step S2), from this point forward, only the display object $302_3$ and the display object $302_4$ adjacent to the display object $302_1$ being an elimination target are allowed to be closer to each other with the display object $302_1$ having lowest priority as an elimination target, and the other display objects 302 (in a case of FIG. 5, the display object $302_4$ and the display object $302_2$) are not allowed to be closer to each other and maintain the interval therebetween.

Next, the display control unit 124 determines whether the collision determination region $303_3$ of the display object $302_3$ and the collision determination region $303_4$ of the display object $302_4$ overlap the collision determination region $303_1$ of the display object $302_1$ being an elimination target, the display object $302_3$ and the display object $302_4$ being adjacent to the display object $302_1$ (Step S3). Here, when the display control unit 124 determines that the collision determination regions $303_3$ and $303_4$ do not overlap the collision determination region $303_1$ (NO in Step S3), the processing returns to Step S1, and Step S1 and the steps thereafter are repeated.

Then, when the size of the display region 211 and the arrangement region 301 is further reduced, the interval between the display object $302_1$ and the display objects $302_3$ and $302_4$ is further reduced, and the display control unit 124 determines that the collision determination regions $303_3$ and $303_4$ overlap the collision determination region $303_1$ (YES in Step S3), the processing proceeds to Step S4.

Next, the display control unit 124 performs the visual processing of reducing the display object $302_1$ according to a degree of overlapping of the collision determination regions $303_3$ and $303_4$ with respect to the collision determination region $303_1$, and the like (Step S4). In this way, a user can recognize that the display object $302_1$ is about to be eliminated.

Next, the display control unit 124 determines whether the degree of overlapping of the collision determination regions $303_3$ and $303_4$ with respect to the collision determination region $303_1$ is equal to or greater than a predetermined threshold value (Step S5). Here, when the display control unit 124 determines that the degree of overlapping is not equal to or greater than the predetermined threshold value (NO in Step S5), the processing returns to Step S1, and Step 1 and the steps thereafter are repeated. In this way, the visual processing performed on the display object $302_1$ continues.

Then, when the size of the display region 211 and the arrangement region 301 is further reduced, the interval between the display object $302_1$ and the display objects $302_3$ and $302_4$ is further reduced, and the display control unit 124 determines that the degree of overlapping of the collision determination regions $303_3$ and $303_4$ with respect to the collision determination region $303_1$ is equal to or greater than the predetermined threshold value (YES in Step S5), attribute information of the display object $302_1$ being an elimination target is changed from a visible state to an invisible state to eliminate the display object $302_1$ (Step S6). After that, the processing returns to Step S1, and Step S1 and the steps thereafter are repeated.

The display control processing when eliminating the display object 302 described above can eliminate, according to relative priority, the display object 302 displayed in the display region 211, performs the visual processing immediately before elimination, and can thus make a user recognize the display object $302_1$ that is about to be eliminated.

Figure 7:
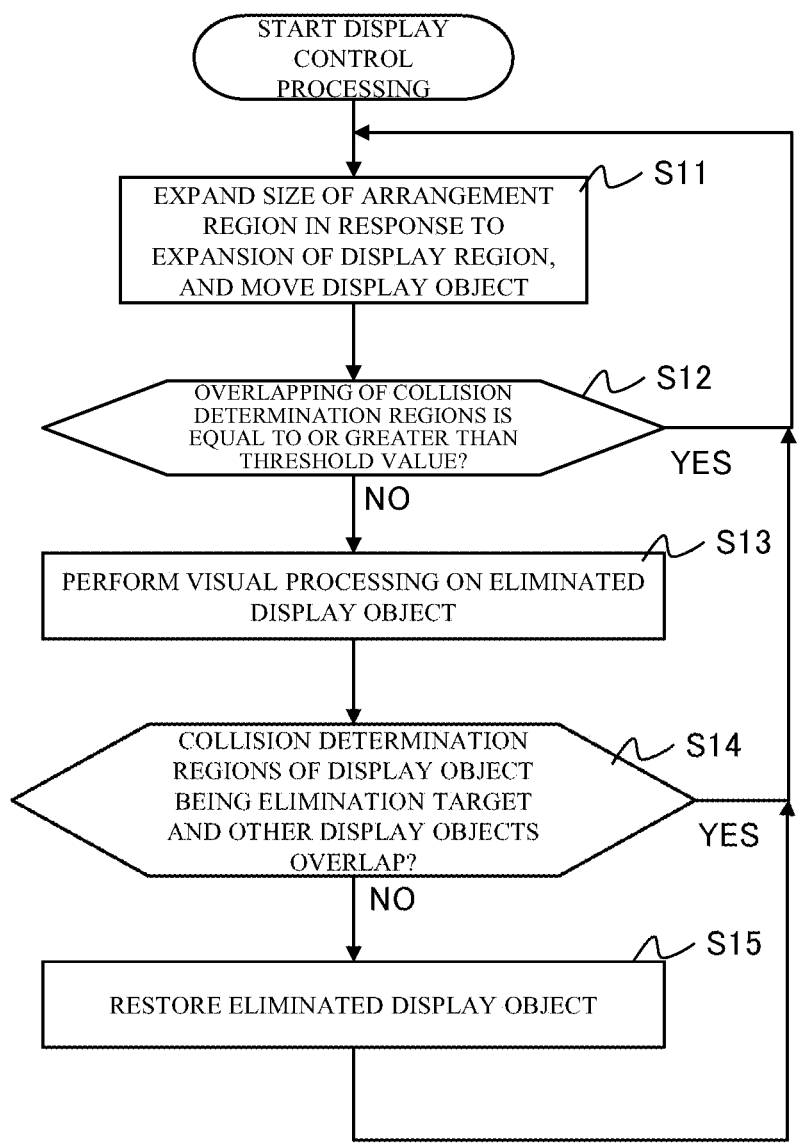
FIG. 7 is a flowchart for illustrating one example of the display control processing when the display object is redisplayed.

Next, FIG. 7 is a flowchart for illustrating one example of display control processing for achieving restored display of the eliminated display object 302 by the visual processing illustrated in FIG. 5.

The display control processing starts after the onboard device 10 is activated, and is continuously performed until an operation of the onboard device 10 ends.

First, when the display region setting unit 123 expands a size of each of the display regions 211 in response to an occurrence of an event that expands the size of the display region 211, the display control unit 124 changes a size and a position of the arrangement region 301 provided in each of the display regions 211. Then, the display control unit 124 moves each of the display objects 302 (including the eliminated display object $302_1$) arranged in the same arrangement region 301 in a direction in which an interval between each of the display objects 302 is increased (Step S11).

Next, the display control unit 124 determines whether a degree of overlapping of the collision determination regions $303_3$ and $303_4$ of the display objects $302_3$ and $302_4$ with respect to the collision determination region $303_1$ of the display object $302_1$ is equal to or greater than a predetermined threshold value (Step S12). Here, when the display control unit 124 determines that the degree of overlapping is equal to or greater than the predetermined threshold value (YES in Step S12), elimination of the display object $302_1$ continues, the processing returns to Step S11, and Step 11 and the steps thereafter are repeated.

Conversely, when the display control unit 124 determines that the degree of overlapping is not equal to or greater than the predetermined threshold value (is less than the predetermined threshold value) (NO in Step S12), the display control unit 124 then displays the display object $302_1$ while performing the visual processing of gradual expansion and the like between the display object $302_3$ and the display object $302_4$ (Step S13). In this way, a user can recognize that the display object $302_1$ is about to be restored and displayed.

Next, the display control unit 124 determines whether the collision determination regions $303_3$ and $303_4$ overlap the collision determination region $303_1$ (Step S14). Here, when the display control unit 124 determines that the collision determination regions $303_3$ and $303_4$ overlap the collision determination region $303_1$ (YES in Step S14), the processing returns to Step S11, and Step S11 and the steps thereafter are repeated. In this way, the visual processing performed on the display object $302_1$ continues.

Then, when the size of the display region 211 and the arrangement region 301 is further expanded, the interval between each of the display objects 302 is further increased, and the display control unit 124 determines that the collision determination regions $303_3$ and $303_4$ do not overlap the collision determination region $303_1$ (NO in Step S14), the display control unit 124 then ends the visual processing performed on the display object $302_1$, and restores display of the display object $302_1$ (Step S15). After that, the processing returns to Step S1, and Step S1 and the steps thereafter are repeated.

The display control processing when restoring and displaying the display object 302 described above performs the visual processing immediately before the eliminated display object 302 is restored and displayed, and can thus make a user recognize the display object $302_1$ that is about to be restored and displayed.

<Specific Examples of Elimination (Restoration) by Visual Processing of Display Object 302>

Figure 8:
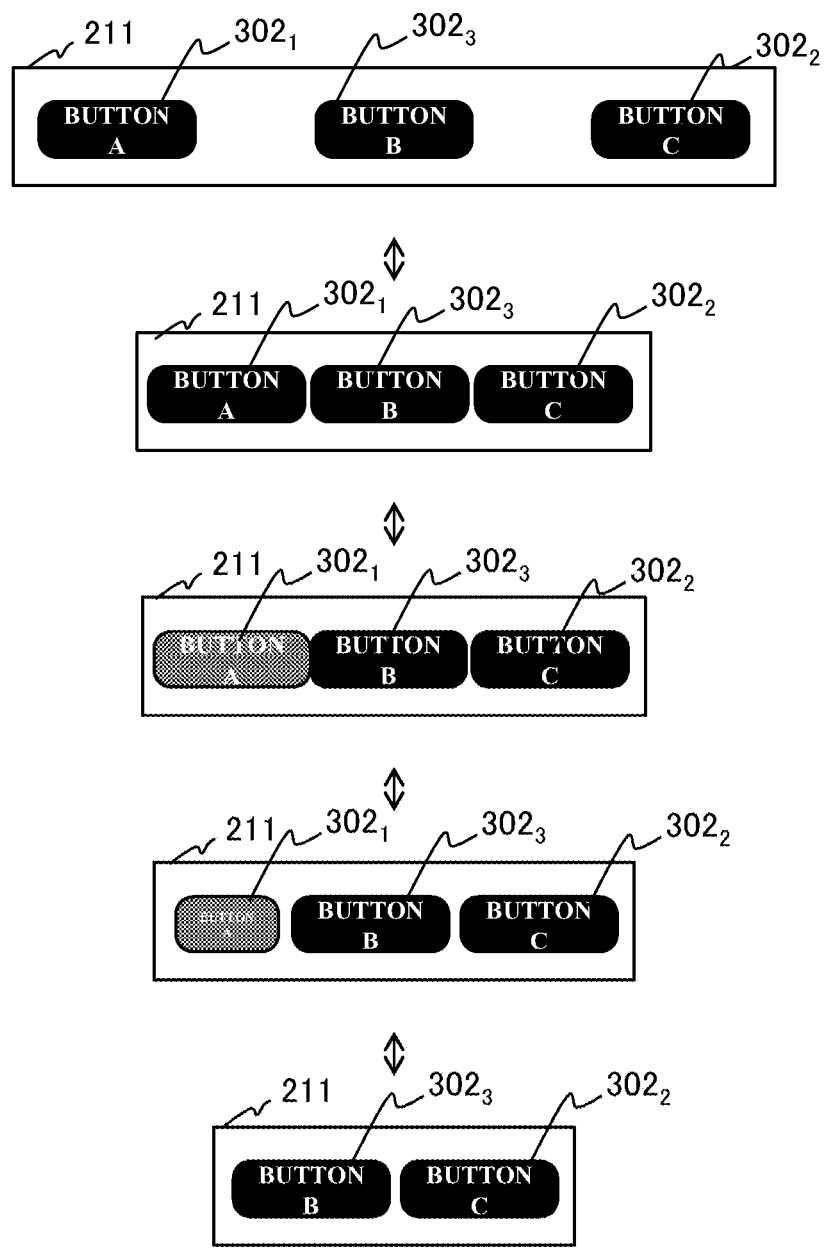
FIG. 8 is a diagram illustrating a specific example of elimination and restoration by visual processing of the display object.
Figure 9:
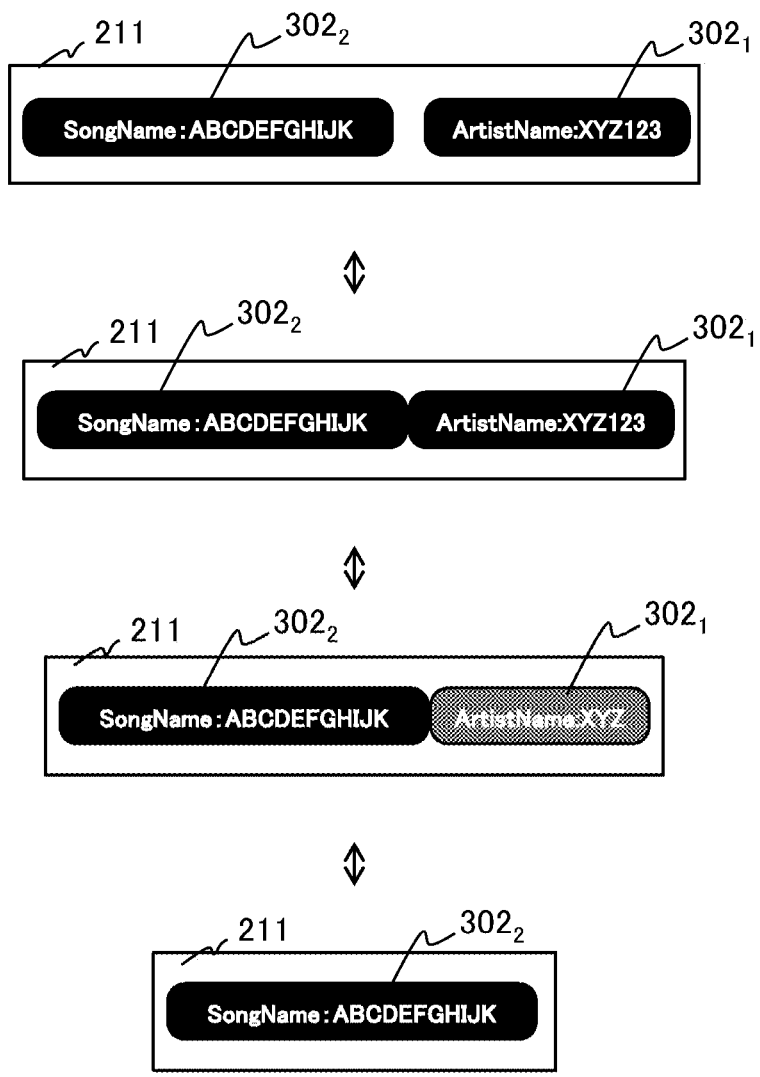
FIG. 9 is a diagram illustrating a specific example of elimination and restoration by the visual processing of the display object.
Figure 10:
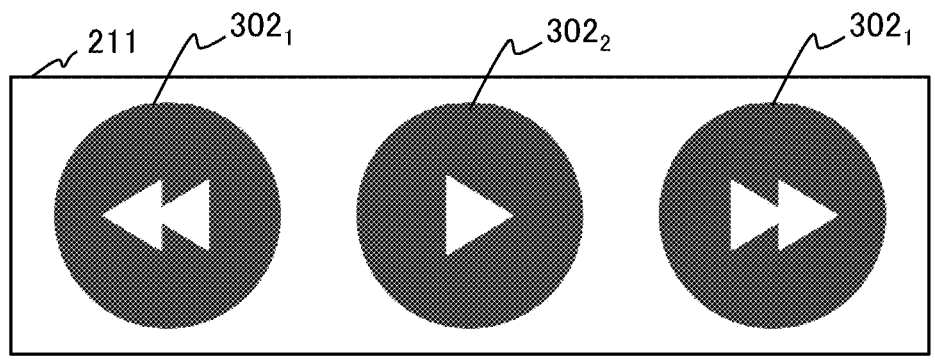
FIG. 10 is a diagram illustrating a specific example of elimination and restoration by the visual processing of the display object.
Figure 10:
Figure 10:
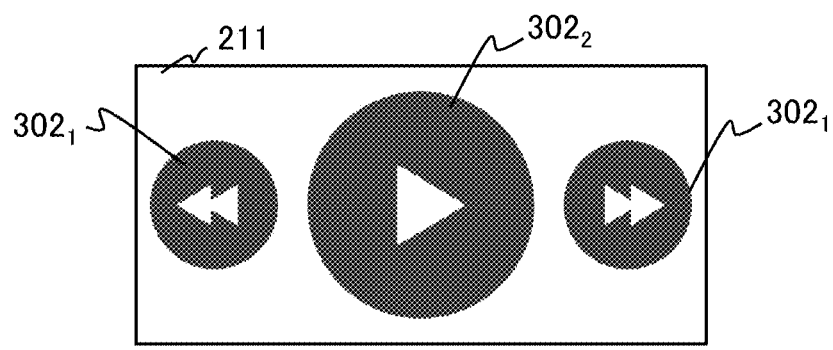
Figure 10:
Figure 10:
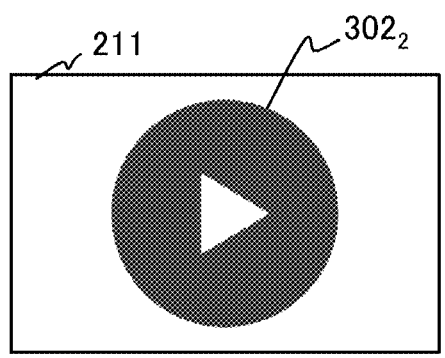

Next, FIGS. 8 to 10 illustrate specific examples of elimination (restoration) by the visual processing of the display object 302.

In the example illustrated in FIG. 8, relative priority of three display objects 302 (buttons A, B, and C) displayed in the display region 211 is in ascending order of the button A, the button C, and the button B. In this case, when a size of the display region 211 and the arrangement region 301 (not illustrated) is reduced, the button A is accordingly eliminated by the visual processing. Then, when the size of the display region 211 and the arrangement region 301 is further reduced, the button C at a right end is then accordingly eliminated by the visual processing (not illustrated).

Conversely, when the size of the display region 211 and the arrangement region 301 is expanded from the state where the buttons A and C are eliminated, the button C is first accordingly restored by the visual processing. When the size of the display region 211 and the arrangement region 301 is further expanded, the button A is accordingly restored by the visual processing.

In the example illustrated in FIG. 9, among two display objects 302 (a SongName display column and an ArtistName display column) displayed in the display region 211, relative priority of the ArtistName display column on the right side is the lowest. When a size of the display region 211 and the arrangement region 301 (not illustrated) is reduced, the ArtistName display column is accordingly eliminated by the visual processing. Specifically, as the visual processing, the ArtistName display column is reduced from the right side, and thus a character string representing ArtistName displayed in the ArtistName display column is gradually deleted from the right side.

Conversely, when the size of the display region 211 and the arrangement region 301 is expanded from the state where the ArtistName display column is eliminated, the ArtistName display column is accordingly restored by the visual processing. Specifically, as the visual processing, the ArtistName display column is extended to the right side, and thus the character string representing ArtistName displayed in the ArtistName display column is added to the right side.

In the example illustrated in FIG. 10, among three display objects 302 (a fast rewind (FR) button, a PLAY button, and a fast forward (FF) button) displayed in the display region 211, relative priority of the FR button and the FF button on both ends is commonly the lowest, and the FR button and the FF button are simultaneously eliminated by the visual processing due to a reduction of a size of the display region 211 and the arrangement region 301 (not illustrated).

Conversely, when the size of the display region 211 and the arrangement region 301 is expanded from the state where the FR button and the FF button are eliminated, the FR button and the FF button are accordingly restored simultaneously by the visual processing.

As illustrated in FIGS. 8 to 10, by changing the visual processing for elimination or restored display according to a specific manner of the display object 302, it is possible to make a user easily recognize which display object is eliminated next and which display object is restored and displayed next.

The present invention can be applied to not only the onboard device 10 including the display 21 as in the present embodiment but also to a case where a screen projected by a projector is controlled, for example. The present invention can be applied to not only the onboard device 10 but also to electronic equipment used in a relatively small space, such as a cockpit and a passenger seat of an airplane, a ship, and the like, for example.

The effects described in the present specification are merely examples, and are not limited thereto. Other effects may be exerted.

The present invention is not limited to the embodiments described above, and includes various modification examples. For example, each of the embodiments described above is described in detail for the sake of easier understanding of the present invention, and the present invention is not necessarily limited to including all the configurations described herein. It is possible to replace a part of a configuration of one embodiment with a configuration of another embodiment. It is also possible to add a configuration of one embodiment to a configuration of another embodiment. Another configuration can be added to, deleted from, and replaced with a part of a configuration of each of the embodiments.

A part of or an entirety of the configurations, functions, processing units, processing means, and the like described above may be implemented by hardware by designing those with, for example, integrated circuits or the like. Each of the configurations, functions and the like described above may be implemented by software by a processor that interprets and executes programs for achieving each function. Information for achieving each of the functions, such as a program, a determination table, and a file may be placed in a storage device such as a memory, an HDD, and a solid state disk (SSD), and a recording medium such as an IC card, a secure digital (SD) card, and a DVD. Illustrations of control lines and information lines are those considered to be necessary for the sake of description, and not necessarily include all the control lines and information lines necessary as a product. In actuality, it may be considered that almost all the configurations are connected to each other.

In addition to the display control device and the display control method, the present invention may be provided in various forms such as a computer-readable program.

What is claimed is:

1. A display control device comprising:
a memory; and
a processor communicatively coupled to the memory,
wherein the processor is configured to:
change a size of a first display region from among a plurality of display regions provided on a screen by changing a position of a boundary line that defines an extent of the first display region among the plurality of the display regions,
set a respective collision determination region that surrounds each respective display object among a plurality of display objects, and
in response to the change in the size of the first display region:
change a size of an arrangement region provided in the first display region,
set a relative priority of each of the plurality of display objects that are arranged in the arrangement region, and
display the plurality of display objects on the screen based on the relative priority,
wherein on a condition that the change of the size of the first display region results in a smaller size of the arrangement region, the processor is configured to:
determine a first display object having a lowest priority amongst the plurality of display objects displayed in the arrangement region based on the relative priority,
reduce an interval between the first display object and a second display object that is adjacent to the first display object amongst the plurality of display objects,
determine a degree of overlapping between the respective collision determination region of the first display object and the respective collision determination region of the second display object,
when the degree of overlapping is equal to or greater than a first predetermined threshold, reduce a size of the first display object from among the plurality of display objects, and
when the degree of overlapping is equal to or greater than a second predetermined threshold value, eliminate the first display object from being visible among the plurality of display objects that are displayed on the screen.

2. The display control device according to claim 1, wherein the processor is further configured to:
eliminate display objects from among the plurality of display objects in ascending order of the relative priority on the condition that the change of the size of the first display region results in the smaller size of the first display region by repeatedly determining the first display object in descending order of the relative priority.

3. The display control device according to claim 2, wherein the processor is further configured to:
  restore the eliminated display objects eliminated in descending order of the relative priority in response to the change of the size of the first display region resulting in a larger size of the first display region.

4. The display control device according to claim 3, wherein the processor is further configured to:
  in response to the change of the size of the first display region resulting in a larger size of the first display region, increase the respective interval between the first display object and the second display object, and
  when the degree of overlapping less than the second predetermined threshold value, restore visibility of the first display object.

5. The display control device according to claim 1, wherein the processor is further configured to:
  change at least one of, transmittance, brightness, or a color of the first display object before the first display object is eliminated.

6. The display control device according to claim 1, wherein the processor is further configured to:
  generate a sound or vibration before the first display object is eliminated.

7. The display control device according to claim 1, wherein reducing the size of the first display object reduces a size of the respective collision determination region of the first display object to form a reduced respective collision determination region.

8. The display control device according to claim 7, wherein the processor is further configured to:
  determine a second degree of overlapping between the respective collision determination region of the first display object and the reduced respective collision determination region,
  when the second degree of overlapping is equal to or greater than the second predetermined threshold value, eliminate the first display object from being visible among the plurality of display objects that are displayed on the screen.

9. The display control device according to claim 1, wherein the size of the first display object is gradually reduced according to the degree of overlapping.

10. A method for controlling a display, the method comprising:
  changing, by a processor, a size of a first display region from among a plurality of display regions provided on a screen by changing a position of a boundary line that defines an extent of the first display region among the plurality of the display regions,
  setting, by the processor, a respective collision determination region that surrounds each respective display object among a plurality of display objects, and
  in response to the changing the size of the first display region:
    changing, by the processor, a size of an arrangement region provided in the first display region,
    setting, by the processor, a relative priority of each of the plurality of display objects that are arranged in the arrangement region, and
    displaying, by the processor, the plurality of display objects on the screen based on the relative priority,
  wherein on a condition that the changing the size of the first display region results in a smaller size of the arrangement region, the method further:
  determines a first display object having a lowest priority amongst the plurality of display objects displayed in the arrangement region based on the relative priority,
  reduces an interval between the first display object and a second display object that is adjacent to the first display object amongst the plurality of display objects,
  determines a degree of overlapping between the respective collision determination region of the first display object and the respective collision determination region of the second display object,
  when the degree of overlapping is equal to or greater than a first predetermined threshold, reduces a size of the first display object from among the plurality of display objects, and
  when the degree of overlapping is equal to or greater than a second predetermined threshold value, eliminates the first display object from being visible among the plurality of display objects that are displayed on the screen.

* * * * *